(12) United States Patent
Gray

(10) Patent No.: US 10,649,464 B2
(45) Date of Patent: *May 12, 2020

(54) COLLISION-AVOIDANCE SYSTEM FOR AUTONOMOUS-CAPABLE VEHICLES

(71) Applicant: UATC, LLC, San Francisco, CA (US)

(72) Inventor: Andrew Gray, San Francisco, CA (US)

(73) Assignee: UATC LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/987,460

(22) Filed: May 23, 2018

(65) Prior Publication Data

US 2018/0373263 A1   Dec. 27, 2018

Related U.S. Application Data

(63) Continuation of application No. 15/631,990, filed on Jun. 23, 2017, now Pat. No. 10,007,269.

(51) Int. Cl.
  *G05D 1/02*  (2020.01)
  *G06K 9/00*  (2006.01)
  (Continued)

(52) U.S. Cl.
  CPC ........... *G05D 1/0248* (2013.01); *B60W 30/09* (2013.01); *G05D 1/0077* (2013.01);
  (Continued)

(58) Field of Classification Search
  CPC .. G05D 1/0077; G05D 1/0088; G05D 1/0248; G05D 2201/0213; G06K 9/00805;
  (Continued)

(56) References Cited

U.S. PATENT DOCUMENTS 5,541,590 A   7/1996 Nisho
9,229,453 B1   1/2016 Lee
(Continued)

FOREIGN PATENT DOCUMENTS

CN   104182756   12/2014
CN   104773177   7/2015
(Continued)

OTHER PUBLICATIONS

Office Action in CA 3,008,091 dated Aug. 24, 2018.
(Continued)

*Primary Examiner* — Atul Trivedi
(74) *Attorney, Agent, or Firm* — Dority & Manning, P.A.

(57) ABSTRACT

A collision-avoidance system for use with an autonomous-capable vehicle can continuously receive image frames captured of the roadway to determine drivable space in a forward direction of the vehicle. The system can determine, for each image frame, whether individual regions of the image frame depict drivable space. The system can do so using machine-learned image recognition algorithms such as convolutional neural networks generated using extensive training data. Using such techniques, the system can label regions of the image frames as corresponding to drivable space or non-drivable space. By analyzing the labeled image frames, the system can determine whether the vehicle is likely to impact a region of non-drivable space. And, in response to such a determination, the system can generate control signals that override other control systems or human operator input to control the brakes, the steering, or other sub-systems of the vehicle to avoid the collision.

20 Claims, 7 Drawing Sheets

(51) Int. Cl.
*G06K 9/62* (2006.01)
*G08G 1/16* (2006.01)
*G05D 1/00* (2006.01)
*B60W 30/09* (2012.01)

(52) U.S. Cl.
CPC ....... *G05D 1/0088* (2013.01); *G06K 9/00805* (2013.01); *G06K 9/6263* (2013.01); *G06K 9/6269* (2013.01); *G06K 9/6277* (2013.01); *G06K 9/6292* (2013.01); *G08G 1/165* (2013.01); *G08G 1/166* (2013.01); *G05D 2201/0213* (2013.01)

(58) Field of Classification Search
CPC .. G06K 9/6263; G06K 9/6269; G06K 9/6277; G06K 9/6292; G08G 1/165; G08G 1/166; B60W 30/09
USPC .......................................................... 701/28
See application file for complete search history.

(56) References Cited

U.S. PATENT DOCUMENTS

| | | | |
|---|---|---|---|
| 10,007,269 B1* | 6/2018 | Gray | G05D 1/0077 |
| 2009/0306881 A1 | 12/2009 | Dolgov | |
| 2015/0120128 A1 | 4/2015 | Rosenstein | |
| 2016/0001781 A1* | 1/2016 | Fung | B60R 25/25 701/36 |
| 2016/0176358 A1* | 6/2016 | Raghu | G06K 9/00798 382/104 |
| 2016/0200161 A1 | 7/2016 | Van den Bossche | |
| 2016/0216130 A1* | 7/2016 | Abramson | G01C 21/3626 |
| 2016/0325753 A1* | 11/2016 | Stein | B60W 40/06 |
| 2017/0008521 A1* | 1/2017 | Braunstein | G01C 21/32 |
| 2017/0132334 A1* | 5/2017 | Levinson | G06F 17/5009 |
| 2017/0166222 A1* | 6/2017 | James | B60W 40/09 |
| 2018/0081362 A1* | 3/2018 | Linke | G08G 1/00 |
| 2018/0164808 A1* | 6/2018 | Prokhorov | B60W 50/08 |
| 2018/0164825 A1* | 6/2018 | Matus | B60W 50/0098 |
| 2018/0186366 A1* | 7/2018 | Gordon | B60W 30/085 |
| 2018/0237005 A1* | 8/2018 | Duan | B60W 30/09 |
| 2018/0267537 A1* | 9/2018 | Kroop | B60W 10/06 |
| 2018/0284785 A1* | 10/2018 | Berntorp | G06K 9/00805 |
| 2019/0034794 A1* | 1/2019 | Ogale | G01C 21/3407 |
| 2019/0049968 A1* | 2/2019 | Dean | G05D 1/0088 |
| 2019/0049969 A1* | 2/2019 | Qawami | H04W 4/46 |

FOREIGN PATENT DOCUMENTS

| | | |
|---|---|---|
| CN | 105539586 | 5/2016 |
| CN | 105799700 | 7/2016 |
| CN | 106553655 | 4/2017 |
| JP | 2010021556 | 1/2010 |
| JP | 2010225105 | 10/2010 |
| JP | 2012118683 | 6/2012 |
| JP | 2014106685 | 6/2014 |
| JP | 2017095100 | 6/2017 |

OTHER PUBLICATIONS

Maria Binfet-Kull, "Safety System for an Autonomous Driving Vehicle", Dec. 31, 1998, pp. 472-474 http:// citeseerx.ist.psu.edu/ viewdoc/ download?doi=10.1.1.32.97008& rep1&type=pdf.
Clemens-Alexander Brust: "Convolutional Patch Networks with Spatial Prior Road Detection and Urgan Scene Understanding", Arxiv.org, Cornel University Library, Feb. 23, 2015, pp. 1-7.
EESR in EP 18179306.8 dated Nov. 18, 2018.
Search Report for application No. 201810653532.3, filed on Jun. 22, 2018, 2 pages.
Office Action from JP 2018-116988, dated Jul. 17, 2019, 14 pages.

* cited by examiner

COLLISION-AVOIDANCE SYSTEM FOR AUTONOMOUS-CAPABLE VEHICLES

CROSS-REFERENCE TO RELATED APPLICATIONS

This application is a continuation of U.S. patent application Ser. No. 15/631,990, titled "COLLISION-AVOIDANCE SYSTEM FOR AUTONOMOUS-CAPABLE VEHICLE," and filed Jun. 23, 2017; the aforementioned application being hereby incorporated by reference in its entirety.

BACKGROUND

Autonomous vehicles refer to vehicles which replace human drivers with sensors and computer-implemented intelligence, sensors and other automation technology. Under existing technology, autonomous vehicles can readily handle driving with other vehicles on roadways such as highways. However, certain environments and weather conditions can adversely affect the performance of certain sensors and the autonomous driving system and can pose challenges to autonomous vehicles.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
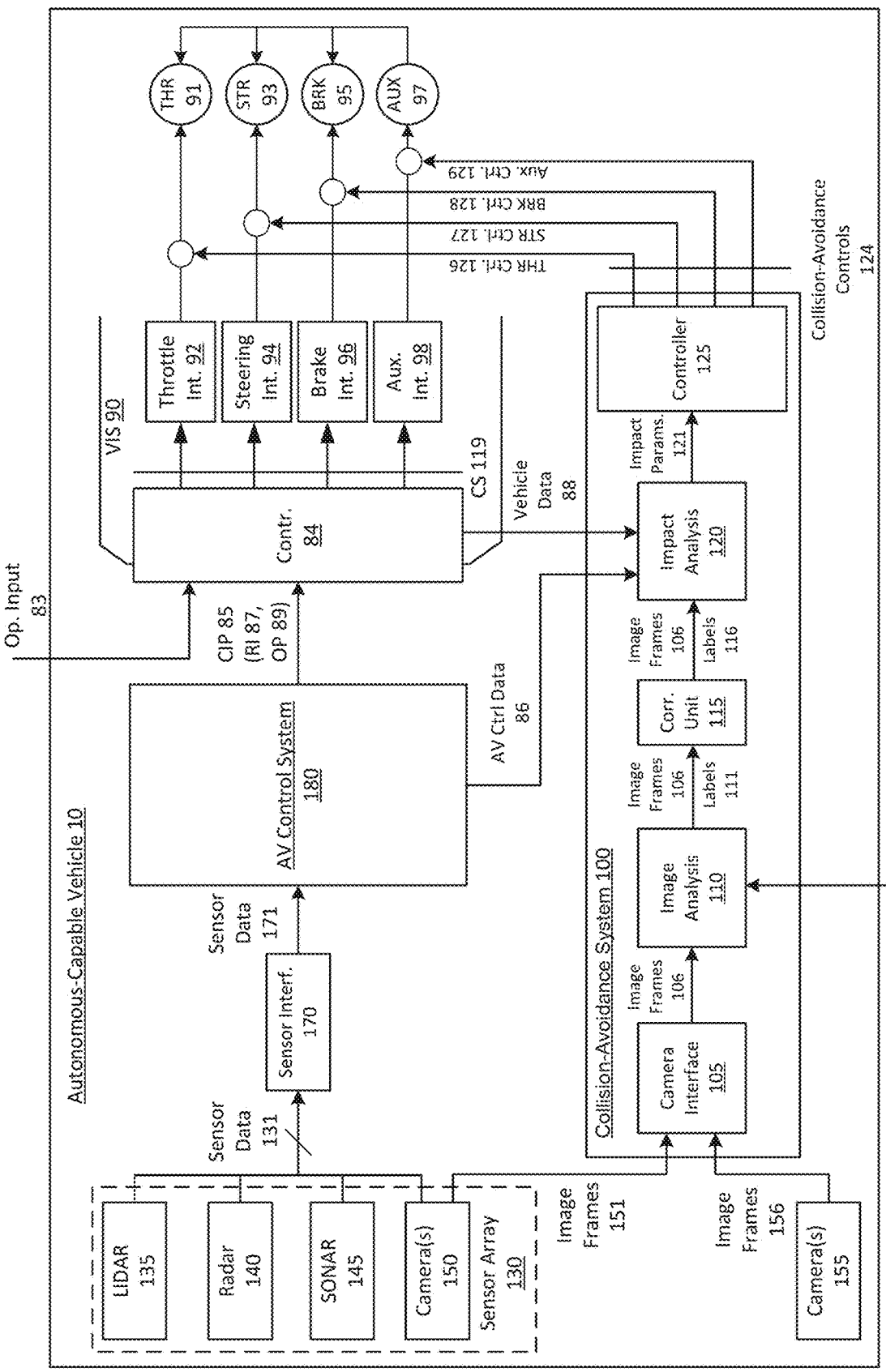
FIG. 1 is a block diagram illustrating an example collision-avoidance system as a part of an autonomous-capable vehicle, in accordance with examples described herein.

As described herein, an autonomous-capable vehicle ("vehicle" for simplicity) can be operated in autonomous, semi-autonomous, or manual modes. In the autonomous or semi-autonomous modes of operation, a control system of the vehicle can operate the vehicle without or with limited human operator input. For example, the control system can apply a throttle to accelerate the vehicle, can steer the vehicle, can engage brakes of the vehicle, and can operate auxiliary functions the vehicle (e.g., activate hazard lights).

In these modes of operation, the control system receives sensor output from an array of sensors to generate vehicle control signals to operate the vehicle. The sensor array can include a Light Detection And Ranging (LIDAR) sensor, one or more cameras, a radar sensor, a sonar sensor, etc. The sensors in the sensor array enable the control system to detect obstacles, vehicles, pedestrians, cyclists, etc. on the road. The control system can, for example, steer and decelerate the vehicle to prevent the vehicle from collisions based on sensor output from the sensor array.

However, because it generates control signals based on sensor output from a plurality of sensors, the control system can be susceptible to errors resulting from conflicting information conveyed by different sensors. For instance, a camera in the sensor array may detect a cyclist on the road but LIDAR sensor may have difficulty detecting the cyclist. In response to the outputs from the camera and the LIDAR sensor, the control system can erroneously determine that there is no cyclist on the road. In addition, certain sensors may have inconsistent or unreliable outputs under certain conditions. For example, the LIDAR sensor can be inaccurate or inconsistent in adverse weather (e.g., rain, snow). Furthermore, the control system itself may fail due to hardware or software failures. Accordingly, there is a need for a reliable and independent collision-avoidance system that can control the vehicle to avoid imminent collisions.

Examples herein provide for an autonomous-capable vehicle that includes a collision-avoidance system that can operate independently of other systems of the autonomous-capable vehicle (e.g., vehicle control system for controlling autonomous vehicle operations). The collision-avoidance system can engage the brakes of the vehicle based on analysis of image frames captured by one or more forward-facing cameras of the vehicle. In particular, the collision-avoidance system can analyze the image frames to identify and label regions of drivable space in a forward direction of the vehicle. Regions in the image frames not identified as drivable space can be treated as non-drivable space that the vehicle should not impact. In addition, by analyzing the image frames, the collision-avoidance system can compute distances from each of the non-drivable space regions to the vehicle. In this manner, the collision-avoidance system can determine a likelihood of the vehicle impacting an identified region of non-drivable space based on the vehicle's speed and trajectory. Based on this determination, the collision-avoidance system can generate a collision-avoidance signal to avoid a collision or minimize the impact of the collision independently of other vehicle systems (e.g., vehicle control system for autonomous operations) or vehicle operator inputs (e.g., brake pedal input). The collision-avoidance signal can cause the vehicle to engage one or more brakes, to make a steering and/or throttle adjustment, etc. to avoid the collision or minimize the impact of the collision.

As used herein, the term "drivable space" can mean road surfaces (e.g., paved road surfaces) that the vehicle can safely traverse without impacting or colliding with other objects. As used herein, the term "non-drivable space" can mean regions that the vehicle cannot safely traverse. Non-drivable space can include sidewalks, curbs, other vehicles, pedestrians, cyclists, walls, road medians, debris, etc. In certain examples, non-paved road surfaces can be identified by the collision-avoidance system as regions of non-drivable space.

According to embodiments, the collision-avoidance system can determine regions of drivable space in a forward direction of the vehicle by analyzing the image frames to label appropriate pixels of the image frames as being representative of drivable space. The collision-avoidance system can do so using a machine-learned model trained to identify regions of images (e.g., pixels or groups of pixels) that are representative of drivable space. In some examples, the collision-avoidance system can determine a corresponding probability that each pixel of an image frame is representative of drivable space. Based on the probability (e.g., the probability being over or under a threshold value), the collision-avoidance system can label the pixel as drivable space. Regions of the image frame not labeled can be identified or treated as non-drivable space. The collision-avoidance system can further determine the distance and direction of the vehicle in relation to each region of non-drivable space.

According to embodiments, the machine-learned model can be generated using training data. The training data can include training image frames. The training image frames can be captured by cameras can be captured by cameras that are similar to the camera(s) on the vehicle. The pixels of each of the training image frames can be labeled as representing drivable space and/or non-drivable space. The labeling of the training image frames can be performed algorithmically with the assistance of a human operator to correct for errors or to resolve conflicts in the analyses. Using the training data, the machine-learned model can be generated. To improve the accuracy of the machine-learned model in identifying drivable space represented in image frames, it is desirable to have a large number of training image frames depicting a variety of road conditions that can be faced by the vehicle.

The generation of the machine-learned model can be performed by one or more computers and data corresponding to generated machine-learned models can be transmitted to the vehicle. In some examples, the vehicle can receive the data over a wireless network connection (e.g., cellular, Wi-Fi, etc.). In addition to or as an alternative, the vehicle can receive the data using a storage device (e.g., flash memory drive, SD card, etc.) or via a physical connection (e.g., USB, wired connection, etc.). The vehicle can include storage devices (e.g., flash memory) to store the data corresponding to the machine-learned model. The data stored in the storage devices can be updated periodically. Thus, the performance of the collision-avoidance system can be improved over time by updating the machine-learned models using updated training data.

In some examples, the machine-learned model can be a convolutional neural network (CNN). The CNN can comprise a plurality of perceptrons (e.g., artificial neurons). The perceptrons can be arranged in layers. There can be an input layer, intermediate layers, and an output layer of perceptrons in the CNN. The collision-avoidance system can input data corresponding to the image frames to the CNN to analyze the image frames to identify regions of drivable space therein. In certain implementations, the CNN can output, for a particular pixel, a likelihood that the particular pixel is representative of drivable space. In other examples, the CNN can output a binary value for the particular pixel, the binary value indicating whether the particular pixel represents drivable space.

In the examples described herein, the collision-avoidance system can determine, based on the speed, trajectory, and acceleration of the vehicle, whether the vehicle is likely to impact a region of non-drivable space (e.g., an obstacle, a curb, a pedestrian). The speed, trajectory, and acceleration of the vehicle can be determined by a system of the vehicle (e.g., the vehicle control system) or by the collision-avoidance system. Upon determining that the vehicle is likely to impact a region of non-drivable space, the collision-avoidance system can generate a collision-avoidance signal to cause the vehicle to avoid impacting the region of non-drivable space. The collision-avoidance signal can activate the brakes of the vehicle. The collision-avoidance system can do so independently of the vehicle control system and/or operator inputs. In other words, the collision-avoidance signal generated by the collision-avoidance system can override control outputs of the vehicle control system and/or operator inputs to, for example, activate the brakes of the vehicle.

According to some examples, the collision-avoidance system can generate collision-avoidance control signals to control other aspects of the vehicle upon determining that the vehicle is likely to impact a region of non-drivable space. For example, the collision-avoidance system can also generate a steering output to alter the trajectory of the vehicle to avoid impacting a region of non-drivable space. In addition, the collision-avoidance system can generate a throttle output and an auxiliary output (e.g., to turn on hazard lights of the vehicle).

In certain implementations, the collision-avoidance system outputs can override vehicle control signals generated by the control system. For example, the control system may generate a control signal to increase the throttle of the vehicle so as to accelerate the vehicle. In response to determining that the vehicle is likely to impact non-drivable space, the collision-avoidance system can generate a collision-avoidance signal to override the control signal (e.g., to stop applying the throttle) and to engage the breaks of the vehicle. As such, the collision-avoidance system can control the vehicle, independently of the control system (and/or independently of human operator input), to avoid collisions.

Numerous examples are referenced herein in context of an autonomous vehicle or autonomous-capable vehicle, which refers to any vehicle which is operated in a state of automation with respect to at least steering, propulsion and braking. When operated in an autonomous operational state, examples provide that a vehicle may ignore human or manual driving input (e.g., accelerator or brake input, steering wheel input), such that the vehicle control system is the only "driver" of the vehicle. As described with various examples, the vehicle may ignore human or manual driving input when the vehicle is in an autonomous operational state, with exception that the vehicle may respond to designated human inputs such as inputs to switch the operational state of the vehicle or to take a safety action (e.g., emergency brake). As described with various examples, the designated human inputs which can transition the operational state of the vehicle may be with detected with respect to interfaces (e.g., mechanical actuators) that are not used for driving the vehicle. Thus, the interface for enabling a human driver to switch the state of the autonomous vehicle may be separate from mechanisms such as steering wheels, accelerators (e.g., "gas pedals"), brakes, or gear shifters.

One or more aspects described herein provide that methods, techniques and actions performed by a computing device are performed programmatically, or as a computer-implemented method. Programmatically means through the use of code, or computer-executable instructions. A programmatically performed step may or may not be automatic.

One or more aspects described herein may be implemented using programmatic modules or components. A programmatic module or component may include a program, a subroutine, a portion of a program, a software component, or a hardware component capable of performing one or more stated tasks or functions. In addition, a module or component can exist on a hardware component independently of other modules or components. Alternatively, a module or component can be a shared element or process of other modules, programs or machines.

Furthermore, one or more aspects described herein may be implemented through the use of instructions that are executable by one or more processors. These instructions may be carried on a computer-readable medium. Machines shown or described with figures below provide examples of processing resources and computer-readable mediums on which instructions for implementing some aspects can be carried and/or executed. In particular, the numerous machines shown in some examples include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash or solid state memory (such as carried on many cell phones and consumer electronic devices) and magnetic memory. Computers, terminals, network enabled devices (e.g., mobile devices such as cell phones) are examples of machines and devices that utilize processors, memory, and instructions stored on computer-readable mediums. Additionally, aspects may be implemented in the form of computer programs.

System Descriptions

FIG. 1 is a block diagram illustrating an example collision-avoidance system as a part of an autonomous-capable vehicle, in accordance with examples described herein. In examples described, an autonomously-capable vehicle can operate without human action which would otherwise operate the vehicle. For example, in the context of automobiles, an autonomously driven vehicle can steer, accelerate, shift, brake and operate lighting components. Some variations also recognize that an autonomous-capable vehicle can be operated either autonomously or manually.

With reference to an example of FIG. 1, the autonomous-capable vehicle 10 includes control systems to operate the vehicle 10 in autonomous, semi-autonomous, or manual modes of operation. In addition, the vehicle 10 includes a collision-avoidance system 100 that operates independently of the control systems of the vehicle 10. In particular, examples provide for the vehicle 10 to include a vehicle interface system 90 to receive primary control signals to control the vehicle 10. The vehicle 10 can also have a plurality of modes of operation, including, for example, a manual mode, a semi-autonomous mode, and an autonomous mode. During the manual and semi-autonomous modes of operation, the vehicle interface system 90 can receive human operator input 83 as the primary control signal to operate the vehicle 10. During autonomous and semi-autonomous modes of operation of the vehicle 10, vehicle interface system 90 can receive command input 85 outputted by AV control system 180 to operate the vehicle 10. Examples provide that in one or more modes of operation of the vehicle 10, the collision-avoidance system 100 can operate to override the primary control signals (e.g., operator input 83, command input 85) to independently control the throttle, braking, steering, and auxiliary functions of the vehicle 10 to avoid collisions with obstacles, pedestrians, curbs, other vehicles, etc. The collision-avoidance system 100 can continuously monitor the space and environment around the vehicle 10 and can distinguish regions of space that are drivable (e.g., paved road without any objects thereon) from regions of space that are non-drivable (e.g., another vehicle, a fence, a curb, etc.). Based on the speed, trajectory, acceleration, and the primary control signals, the collision-avoidance system 100 can determine whether the vehicle 10 is likely, without intervention from the collision-avoidance system 100, to impact a region of space determined to be non-drivable. In response to this determination, the collision-avoidance system 100 can intervene to override the primary control signals and independently control the throttle, steering, braking, and auxiliary functions of the vehicle 10 to avoid a collision.

The vehicle 10 can be equipped with a sensor array 130 that includes multiple types of sensors such as a LIDAR sensor 135, a radar sensor 140, a Sound Navigation and Ranging (SONAR) sensor 145, and a camera(s) 150. The sensors in the sensor array 130 can combine to provide a computerized perception of the space and environment surrounding the vehicle 10. In particular, the camera(s) 150 can include multiple sets of camera sensors (e.g., video camera, stereoscopic pairs of cameras, depth perception camera, infrared camera, wide-angle camera, etc.) to monitor the environment surrounding the vehicle 10. In addition, the LIDAR 135, radar 140, and SONAR 145 sensors can detect objects surrounding the vehicle 10 and their respective distances to the vehicle 10. The output from the sensor array 130—sensor data 131—is received by a sensor interface 170. The sensor interface 170 can include a separate interface device for each of the sensors in the sensor array 130. For example, the sensor interface 170 can include a LIDAR interface device for the LIDAR sensor 135 and a camera interface device for the camera(s) 150. The sensor interface 170 can include hardware and/or other logical components that process the received sensor data 131. For instance, the LIDAR interface device receiving LIDAR data from the LIDAR sensor 135 can include logic and processing resources (e.g., a field programmable gate array ("FPGA"), a digital signal processor ("DSP"), etc.) to convert the received LIDAR data into a format that can be used by the AV control system 180. As another example, the camera interface device receiving camera data (e.g., raw image data) from the camera(s) 150 can convert the data into formats (e.g., JPEG or other compressed or uncompressed data formats) used by the AV control system 180. In certain implementations, the sensor interface 170 can perform processing to improve sensor data quality. For instance, the camera interface device can reduce noise, adjust exposure, perform gamma correction, adjust color, adjust focus, and perform other processing of the raw image data. The processed sensor data can be outputted as sensor data 171.

According to one implementation, the vehicle interface system 90 can include or control multiple vehicle interfaces, including a throttle interface 92, a steering interface 94, a braking interface 96, and auxiliary interface 98. Each of the vehicle interfaces controls a corresponding subsystem of the vehicle 10. For example, the throttle interface 92 controls the throttle of the engine of the vehicle 10 to accelerate the vehicle 10. The steering interface 94 controls the steering column of the vehicle 10 to steer the vehicle 10. The brake interface 96 controls one or more brakes of the vehicle 10 to decelerate the vehicle 10. The auxiliary interface 98 controls one or more auxiliary functions the vehicle 10 such as operating the hazard lights, etc. The vehicle interface system 90 can further include a controller 84 to receive primary control signals (e.g., operator input 83, command input 85) that control the vehicle interfaces during normal operations of the vehicle 10. The controller 84 can control the various vehicle interfaces 92-98 based on the received primary control signals.

In certain implementations, the vehicle 10 can operate in a manual mode of operation, in which a human operator generates the primary control signal received by the vehicle interface system 90. In the manual mode, the vehicle interface system 90 receives human operator input 83 and generates control signal 119 to control the various vehicle subsystem interfaces 92, 94, 96, 98. For example, the controller 84 of the vehicle interface system 90 can receive a throttle input from an accelerator pedal in the vehicle passenger cabin. Similarly, the controller 84 can receive a steering input from a steering wheel and a brake input from a brake pedal. In some examples, the human operator input 83 can be received directly by the vehicle interfaces. For instance, the throttle interface 92 can directly receive an operator throttle input and the brake interface 96 can directly receive an operator brake input.

In some examples, the vehicle 10 can also operate in an autonomous mode and/or a semi-autonomous mode of operation. In these modes of operation, the AV control system 180 can generate command input 85, which is received by the vehicle interface system 90 as the primary control signal to operate the vehicle. The AV control system 180 can generate the command input 85 based on the received processed sensor data 171. The command input 85 can include route information 87 and one or more operational parameters 89 which specify an operational state of the vehicle 10 (e.g., desired speed, acceleration, etc.). The controller 84 generates control signals 119 based on the command input 85 for the one or more vehicle interfaces 92, 94, 96, 98, to control throttle, steering, braking, and auxiliary vehicle functions.

In one implementation, the AV control system 180, in the semi-autonomous mode of operation, can control some of the subsystems of the vehicle 10. For instance, the AV control system 180 can generate command input 85 to control the throttle subsystem 91 and the brake subsystem 95 of the vehicle 10. The steering subsystem 93 can be controlled by operator input 83 to the vehicle interface system 90 from a human operator of the vehicle 10. In other implementations, the AV control system 180, in the semi-autonomous mode of operation, can control all operations of the vehicle 10, but can require periodic operator input 83 to indicate that the human operator is monitoring the progress of the vehicle 10 to override the command input 85 from the AV control system 180 if necessary.

According to embodiments, the vehicle 10 can include a collision-avoidance system 100 that operates independently from the AV control system 180 and/or from the human operator of the vehicle 10. The collision-avoidance system 100 can override the command input 85 generated by the AV control system 180 to prevent the vehicle 10 from colliding with objects in the vehicle's path. The collision-avoidance system 100 can also override operator input 83 from the human operator of the vehicle 10.

In some implementations, the collision-avoidance system 100 can be implemented on separate hardware and software from the AV control system 180.

In other words, the collision-avoidance system 100 can be implemented on one or more dedicated processing resources (e.g., CPUs, GPUs, DSPs, FPGAs, ASICs, etc.) executing software instructions dedicated for the collision-avoidance system 100. The software instructions can also be stored memory dedicated for the collision-avoidance system 100. In this manner, the collision-avoidance system 100 can be functional and provide safety redundancy in the event of a hardware or software failure with the AV control system 180. In other implementations, the collision-avoidance system 100 can be implemented on hardware shared with the AV control system 180. For instance, the AV control system 180 and the collision-avoidance system 100 can share sensors, processing resources, memory resources, and the like. In this manner, the complexity and costs of implementing the collision-avoidance system 100 on the vehicle 10 can be reduced. In these implementations, the processing resources of the vehicle 10 can execute the instructions corresponding to the functionalities of the collision-avoidance system 100 at a higher priority level than instructions corresponding to the AV control system 180 to ensure that the collision-avoidance system 100 can override control input 83 generated by the AV control system 180.

In certain implementations, the camera(s) 150 and camera (s) 155 can be video cameras and/or stereoscopic camera sets that continually generate image data (e.g., 30 image frames per second, 60 image frames per second, 120 image frames per second, etc.). The cameras 150 and 155 can be positioned to capture image frames in a forward direction of the vehicle 10.

According to examples, the collision-avoidance system 100 can include a camera interface 105 for receiving image frames 151 from the camera(s) of the sensor array 130. The camera interface 105 can also receive image frames 156 from additional camera(s) 155. The additional camera(s) 155 can be one or more cameras or camera sets dedicated for the collision-avoidance system 100. The camera(s) 155 can include a wide-angle, forward-facing camera. By receiving image frames 156 from camera(s) 155, the collision-avoidance system 100 can operate to prevent the vehicle 10 from colliding with objects in the vehicle's path even when the camera(s) 150 of the sensor array 130 (or the sensor array 130 itself) malfunctions. Furthermore, camera(s) 155 can be positioned in a different location (e.g., on the front bumper of the vehicle 10) as compared with the camera(s) 150 to improve the field of vision (e.g., reduce blind spots, increase angle of view, etc.) of the collision-avoidance system 100. In some implementations, the camera(s) 150 of the sensor array 130 provides sufficient reliability and field of vision for the collision-avoidance system 100. In these implementations, the additional camera(s) 155 may not be needed, and, by combining utilizing existing camera(s) 150 of the sensor array 130, the cost for implementing the collision-avoidance system 100 can be reduced.

According to some examples, the camera interface 105 can include image-processing resources, such as provided with a field programmable gate array ("FPGA") or a digital signal processor ("DSP"), which receives and/or processes image frames 151 and 156 from the camera(s) 150 and 155. For example, the image-processing resources of the camera interface 105 can perform image-processing operations to merge the image frames 151 and 156. The collision-avoidance system 100 can perform image analysis on the merged image frame to generate the safety control outputs. As an alternative, separate image analyses can be performed on the image frames 151 and 156 and the results of the separate image analyses are reconciled to generate the safety control outputs. In addition, the image-processing resources of the camera interface 105 can also perform image-processing operations to process raw image frames 151 and 156 to, for example, adjust the exposure, contrast, and color palette of the raw image frames 151 and 156. The image-processing resources can also perform filtering, reduce noise, and perform cropping or shifting of the raw image frames 151 and 156. The image processing can be performed in order to improve image quality and improve performance and accuracy of the image analyses of the collision-avoidance system 100 in identifying drivable space in the images frames captured by the cameras 150 and 155. The camera interface 105 can output processed image frames 106.

In one implementation, the image-processing resources of the camera interface 105 can modify certain characteristics of the image frames 151 and 156 to render the processed image frames 106 more similar to image frames in the training data used to generate the machine-learned model used by the collision-avoidance system 100. For example, the image frames in the training data can exhibit certain characteristics with respect to color palette, hue, exposure, and contrast. The image-processing resources of the camera interface 105 can perform image-processing operations to render the processed image frames 106 to be similar in those characteristics as compared with the training data image frames. In particular, the image-processing resources of the camera interface 105 can apply a hue or color filter to generate the processed image frames 106 to, for example, minimize effects caused by the cameras 150 and 155 and/or by lighting conditions of the vehicle's environment. For instance, the image-processing resources of the camera interface 105 can determine that the contrast of a particular image frame 151 or 156 is higher than that of the training data image frames (e.g., average or median value). In response, the image-processing resources of the camera interface 105 can reduce the contrast to generate processed image frame 106, such that the contrast of the image frame 106 is closer to the average or median contrast of the training data image frames. In this manner, accuracy and consistency with respect to identification of drivable space in the processed image frames 106 by the collision-avoidance system 100 can be improved.

According to embodiments, the collision-avoidance system 100 includes image analysis 110 that receives and analyzes the processed image frames 106 from the camera interface 105. In various aspects, image analysis 110 can identify drivable space depicted in the processed image frames 106 by analyzing the processed image frames 106 and labeling appropriate pixels in the processed image frames 106 as depicting drivable space. For instance, pixels corresponding to a paved road on which the vehicle 10 is traveling can be labeled by the image analysis 110 as drivable space. In contrast, pixels corresponding to a pedestrian captured in the processed image frames 106 would not be labeled by the image analysis 110 as drivable space. In some implementations, pixels corresponding to a pedestrian, other vehicles, objects, or obstacles captured in the image frames 106 would be labeled as non-drivable space by the image analysis 110.

In some examples, the image analysis 110 can analyze the processed image frames 106 using a machine-learned model 112. The machine-learned model 112 can be generated based on training data and received by the vehicle 10 via a communication interface (not shown in FIG. 1). The communication interface can receive data corresponding to the machine-learned model 112 through a wireless connection (e.g., cellular link, Wi-Fi link, etc.) or a physical interconnection (e.g., USB connection). The data corresponding to the model 112 can be stored in one or more storage devices on the vehicle 10 that are accessible to the collision-avoidance system 100. The model 112 can be updated periodically based on updated training data and received by the vehicle 10. In this manner, the performance of the image analysis 110 and the collision-avoidance system 100 can be improved over time as additional training data is collected.

In various aspects, the training data can comprise training image frames. The training image frames can depict real-world road conditions and can be images captured by cameras similar to cameras 150 and 155. For example, cameras on a fleet of vehicles can capture the training image frames as the vehicles operate under real-world conditions. The training image frames can be analyzed and drivable space in the training image frames can be identified. For instance, appropriate pixels of the training image frames can be labeled as representing drivable space. The analyses of the training image frames can be performed programmatically with human supervision, correction, and/or quality checking. In some cases, the training data can include sensor data. For example, each training image frame can be associated with a set of LIDAR sensor data. The set of LIDAR sensor data can indicate LIDAR measurements taken at the time the associated training image frame was captured. The LIDAR data can aid in the analyses of the training images. For instance, LIDAR measurements can be used to identify objects depicted in the training image frames that should not be labeled as drivable space.

According to embodiments, the model 112 can be a convolutional neural network (CNN) generated using the training data. The CNN model 112 can comprise a plurality of layers, each of which can comprise a plurality of artificial neurons. Using the CNN model 112, the image analysis 110 can determine whether regions of the processed image frames 106 depict drivable space. In some examples, the image analysis 110 can determine a likelihood (e.g., a confidence score) that a particular region of the processed image frame 106 depicts drivable space. In addition, different implementations of the image analysis 110 can perform the analysis at different levels of resolution or detail. In some implementations, the image analysis 110 can analyze the processed image frames 106 to determine a likelihood of each individual pixel of the processed image frames 106 depicting drivable space. In other implementations, the image analysis 110 can perform the analyses at lower resolution or detail to determine likelihoods of groups of pixels (e.g., contiguous group of ten pixels) as depicting drivable space.

The image analysis 110 can generate labels 111 that identify the drivable spaces depicted in the processed image frames 106. In some implementations, the labels 111 can be output by the image analysis 110 as matrix data structures. Each value in the matrix data structure of a label 111 can correspond to a label of a pixel (or pixel group) of the corresponding processed image frame 106. For instance, for a processed image frame 106 having a resolution of 3840×2160 pixels, the corresponding label 111 determined by the image analysis 110 can be a matrix data structure having 3840×2160 data values, each of the data values indicating the drivable space label determined for a corresponding pixel of the processed image frame 106. In some implementations, the processed image frame 106 and the corresponding label 111 can be stored as one data structure (e.g., a multi-dimensional array or matrix).

The collision-avoidance system 100 can include a correction unit 115 to perform corrections in the labeling of the processed image frames 106. In doing so, the correction unit 115 can receive both the processed image frames 106 and corresponding labels 111 determined by the image analysis 110. In one implementation, the corrections unit 115 can examine multiple processed image frames 106 and their associated labels 111 to remove outlier labels in the processed image frame 106. For example, one particular processed image frame 106 may have small region (e.g., a single pixel, a small group of pixels) not labeled as drivable-space that is surrounded by another region(s) that are labeled as drivable-space. In such an instance, the correction unit 115 can determine that the small region that is not labeled as drivable-space (or labeled as non-drivable space) by the image analysis 110 is an outlier and can be ignored by collision-avoidance system 100. Such outliers can result from small (and non-threatening) objects on the roadway depicted in the processed image frame 106 being detected by the image analysis 110. As another example, the correction unit 115 can compare labels 111 generated for multiple processed image frames 106 captured at around the same time to identify outliers that can be ignored by the collision-avoidance system 100. In removing the outliers and other labeling errors, the correction unit 115 can generate corrected labels 116.

According to embodiments, the collision-avoidance system 100 can include an impact analysis 120 that determines whether a forward-direction collision involving vehicle 10 is about to occur. The impact analysis 120 can do so based on information regarding the current trajectory, speed, and controls of the vehicle 10, including AV control data 86 and vehicle data 88, and the processed image frames 106 and/or the corrected labels 116. Based on the processed image frames 106 and/or the corrected labels 116, the impact analysis 120 can determine spatial parameters for each region of non-drivable space in the processed image frames 106. Spatial parameters can include a position relative to the vehicle 10, a distance from the vehicle 10, a rate of travel (for moving objects), and a direction of travel (also for moving objects). In response to determining that a collision is about to occur, the impact analysis 120 can generate impact parameters for the controller 125. The controller can generate collision-avoidance controls 124 to control various sub-systems of the vehicle 10 to avoid colliding with the non-drivable space or to minimize the impact of any such collision. The collision-avoidance controls 124 can include throttle control 126, steering control 127, brake control 128, and auxiliary control 129.

Autonomous-Capable Vehicle Description

Figure 2:
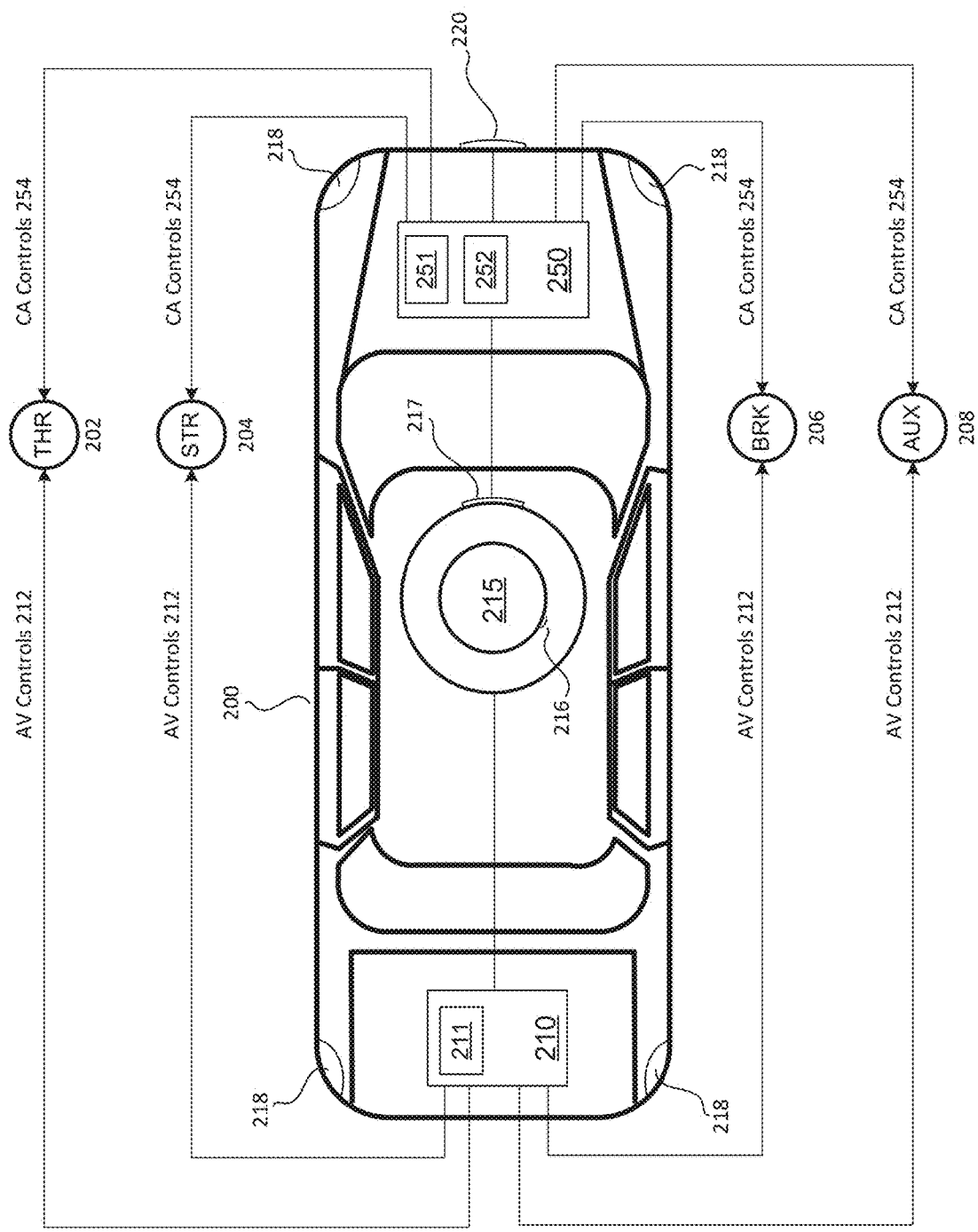
FIG. 2 illustrates an example of an autonomous-capable vehicle that includes an implementation of a collision-avoidance system, in accordance with examples described herein.

FIG. 2 illustrates an example of an autonomous-capable vehicle that includes an implementation of a collision-avoidance system, in accordance with examples described herein. In the below discussion of FIG. 2, reference may be made to features and examples shown and described with respect to FIG. 1. For instance, the vehicle 200 illustrated in FIG. 2 can be vehicle 200 of FIG. 1. In addition, collision-avoidance system 250 in FIG. 2 can be the collision-avoidance system 100 illustrated in and described with respect to FIG. 1.

In the example illustrated in FIG. 2, the vehicle 200 includes an autonomous vehicle (AV) control system 210 that can control the operation of the vehicle in semi-autonomous and/or fully-autonomous modes of operation. In these modes of operation, the AV control system 210 receives sensor output from sensors on the vehicle to generate control signals to control one or more aspects of the vehicle's operation. The AV control system 210 can be implemented using a combination of processing resources 211 and storage resources and can comprise one or more general-purpose CPUs, dedicated GPUs, and memory elements. The processing resources 211 can be centralized, distributed and/or include resources dedicated for specific resources. In operation, the processing resources 211 of the AV control system 210 can implement models, decision making algorithms, routing and trajectory determination, external communications and various other processes as part of its normal operation.

Sensors on the vehicle can include a sensor array 215 positioned on top of the vehicle. The sensor array 215 can include a LIDAR sensor 216 generating LIDAR measurements and one or more cameras 217 for capturing image frames. The one or more cameras 217 can collectively generate a generate images frames that depict a 360° perspective around the vehicle 200. The one or more cameras 217 can include stereoscopic camera pairs, video cameras, infrared cameras, and/or other specialized image capturing devices. The sensor array 215 can further include other ranging or detection sensors such as radars, ultrasonic ranging sensors, etc. Additionally, peripheral sensors such as radars, ultrasonic sensors, sonars, or other types of detectors can be positioned in suitable locations about the vehicle 200 (e.g., front bumper, bumper corners, side fenders, mirrors, rear bumper, etc.) to cover any blind spots of the sensor array 215. For example, multiple radar sensors 218 may be distributed about a perimeter of the vehicle. A front-facing camera 220 may also be positioned on the front bumper of the vehicle. Other cameras may be mounted to the exterior of the vehicle, or within an interior of the windshield.

The vehicle 200 can include operational features (or devices) referred to as vehicle control subsystems 202, 204, 206, 208. The vehicle control interfaces may include throttle control subsystem 202, steering control subsystem 204, braking control subsystem 206, and auxiliary control subsystem 208. The subsystems can be controlled by control interfaces of the vehicle 200 (e.g., interfaces 92, 94, 96, and 98 of FIG. 1). The operational features shown are only examples, and more or fewer operational features of the vehicle 200 can be utilized with variations to examples as described. In an example of FIG. 2, the operational facets are represented by interfaces which can be commanded or otherwise controlled by individual control systems of the vehicle 200.

According to some examples, the processing resources 211 can include one or more processors, and/or programmatic and hardware interfaces which provide for control parameters, shown in FIG. 2 as controls 212, to be continuously generated and signaled to the individual vehicle control subsystems 202, 204, 206, 208 of the vehicle 200 as the vehicle operates autonomously or semi-autonomously. Thus, for example, the controls 212 can be communicated from the processing resources 211 (and AV control system 210) to the respective vehicle control interfaces 202, 204, 206, 208. The processing resources 211 may determine one or more trajectories for the vehicle, and then implement the trajectories via controls 212. The trajectories may define one or multiple possible trajectories of the vehicle for a given future interval. For example, the trajectories can include one or more primary trajectories of the vehicle, and/or a failsafe trajectory which the vehicle is to implement in the event the AV control system 210 has a cataclysmic failure.

In the example of FIG. 2, the vehicle 200 includes a collision-avoidance system 250 that independently controls one or more operational features of the vehicle 200. In doing so, the collision-avoidance system 250 can continuously receive image frames from cameras 217 and 220. The collision-avoidance system 250 can analyze the received image frames to determine that the vehicle 200 is likely to impact a region of non-drivable space (e.g., another vehicle, a curb, a pedestrian, a cyclist, etc.). In response to such a determination, the collision-avoidance system 250 can generate collision-avoidance controls to avoid or minimize such an impact. The collision-avoidance controls generated by the collision-avoidance system can, independently of other control systems of the vehicle (e.g., AV control system 210)

or human operator input, control one or more operational features of the vehicle 200. In one implementation, the collision-avoidance system 250 can independently engage the brakes of the vehicle 200 via the braking control subsystem 206 upon determining that a collision is likely to occur. In other implementations, the collision-avoidance system 250 can independently control the steering of the vehicle 200 via the steering control subsystem 204 and engage the brakes of the vehicle 200 via the braking control subsystem 206. In addition, the collision-avoidance system 250 can override the controls received by the throttle control subsystem 202 to disengage the throttle of the vehicle upon determining that a collision is imminent or likely to occur. Thus, human operator input and/or the AV control system 210 can be overridden by the collision-avoidance system 250.

The functions performed by the collision-avoidance system 250 can include: continuously receiving image frames from the cameras 217, 220; analyzing the received image frames to identify drivable space depicted in each of the image frames; performing spatial analysis to determine a respective distance and direction of each region of non-drivable space (e.g., regions not identified as drivable space) from the vehicle 200; determining a respective probability the vehicle 200 will impact each region of non-drivable space based on the determined distance and direction and based on vehicle data (e.g., speed, trajectory, acceleration, etc.); based on probabilities of impact, determining collision-avoidance controls 254 to mitigate, minimize, or avoid a collision. The identification of drivable space in each received image frame can be performed by applying one or more machine-learned models. Using the machine-learned models, the collision-avoidance system 250 can determine a probability that each pixel (or each group of pixels) of each image frame depicts drivable space. Pixels for which the corresponding probabilities exceed a threshold can be labeled as "drivable space." Conversely, pixels for which the corresponding probabilities are below the threshold can be labeled as "non-drivable space."

The collision-avoidance system 250 can be implemented using a combination of processing resources 251 and memory resources 252. The processing resources 251 can comprise one or more general-purpose CPUs, one or more dedicated processors (e.g., GPUs), and other localized or distributed processing resources. The memory resources 252 can be used to store data corresponding to one or more machine-learned models used to analyze received image frames and identify drivable space and non-drivable space depicted in each of the received image frames. The memory resources 252 can further include cache memory to store received image frames. For example, a received image frame can be analyzed and stored in the cache memory. In this manner, operations that require multiple image frames received over a period of time (e.g., correction operations) can be performed by the collision-avoidance system 250.

According to some implementations, the throttle 202, steering 204, braking 206, and auxiliary 208 can each be independently controlled by output of the collision-avoidance system 250 (e.g., collision-avoidance controls 254). The collision-avoidance controls 254 can override any other input to the vehicle control subsystems 202, 204, 206, 208 such as controls generated by the AV control system 210 (e.g., AV controls 212) or human operator input. In this manner, when no imminent collision is detected by the collision-avoidance system 250, the vehicle 200 is controlled by the human operator of the vehicle 200 or by the AV control system 210. As soon as the collision-avoidance system 250 detects an imminent collision and generates collision-avoidance controls 254, one or more aspects of the vehicle's operations are controlled by the outputs of the collision-avoidance system 250

In one example, the collision-avoidance system 250 can be configured to receive real-time data and analysis from the AV control system 210 to determine whether to intervene and override the AV control system 210. For instance, the collision-avoidance system 250 can be configured to receive data and information regarding objects and obstacles detected by the AV control system 210. If the received data and information conflict with analyses performed by the collision-avoidance system 250 (e.g., collision-avoidance system 250 detects imminent collision with an object not identified by the AV control system 210), the collision-avoidance system 250 can determine to generate collision-avoidance controls 254 to override the output of the AV control system 210 (e.g., AV controls 212). On the other hand, if the data and information received from the AV control system 210 is congruent with analyses performed by the collision-avoidance system 250, the collision-avoidance system 250 can determine to allow the AV control system 210 to control the vehicle 200 to avoid the potential collision via AV controls 212. In addition, data received from the AV control system 210 can include data regarding the health of the AV control system 210. For instance, upon receiving data indicating that the AV control system 210 is experience cataclysmic software or hardware failures, the collision-avoidance system 250 can intervene to control one or more aspects of the operation of the vehicle 200.

According to embodiments, the AV control system 210 can be implemented using the processing resources 211 (e.g., shown located in the trunk of the vehicle 200), separate and independent of the collision-avoidance system 250. Likewise, the processing resources 251 of the collision-avoidance system 250 can represent separate and independent resources from those of the AV control system 210. Thus, for example, the processing resources 211 and processing resources 251 can utilize separate (i) programming or logical platforms and architecture, (ii) input sensors (e.g., cameras), and (iii) communication busses for communicating with other components of the vehicle 200, including those vehicle interfaces that are to be controlled by the respective system or units. For instance, the camera 220 on the front bumper of the vehicle 200 can be dedicated for the collision-avoidance system 250. In some variations, the AV control system 210 and collision-avoidance system 250 can include separate housings, as well as separate power busses or sources of power. In this manner, any hardware or power failures affecting the AV control system 210 can be contained and would not affect the collision-avoidance system 250.

In other implementations, the AV control system 210 and the collision-avoidance system 250 can share physical processing resources and memory resources. In other words, the processing resources 211 and processing resources 251 can be implemented on one or more shared physical processors (e.g., CPUs, GPUs, etc.). In such implementations, the software instructions and modules implementing the functionalities of the AV control system 210 and the collision-avoidance system 250 can nevertheless be separately maintained and executed by the one or more shared physical processors. In one example, one or more shared physical processors implement a first set of logical cores to execute software instructions corresponding to the functionalities of the AV control system 210 and a second set of logical cores to execute software instructions corresponding to the functionalities of the collision-avoidance system 250. In this manner, software and logical failures of the software implementing the AV control system 210 is contained to the functionalities of the AV control system 210 itself and do not affect the functionalities of the collision-avoidance system 250. In another example, software instructions corresponding to the collision-avoidance system 250 can be executed by the one or more shared physical processors at a higher priority level than software instructions corresponding to other systems of the vehicle 200 that utilize the one or more shared physical processors, including the AV control system 210. This can ensure that processing performed by the collision-avoidance system 250 (e.g., analyzing image frames, identifying drivable and non-drivable space, spatial analyses, directional analyses) are performed in real-time to avoid or mitigate potential collisions with detected objects in the path of travel of the vehicle 200.

In addition, the vehicle 200 can include one or more communication interfaces (not shown in FIG. 2) to receive data corresponding to the one or more machine-learned models used in the analyses performed by the collision-avoidance system 250. The communication interfaces can comprise cellular (e.g., 4G, 5G, LTE, etc.), Wi-Fi, and wired interfaces (e.g., wireline data connector). In this manner, the machine-machine learned models can be periodically updated based on additional training data.

Training Data Processing System Description

Figure 3:
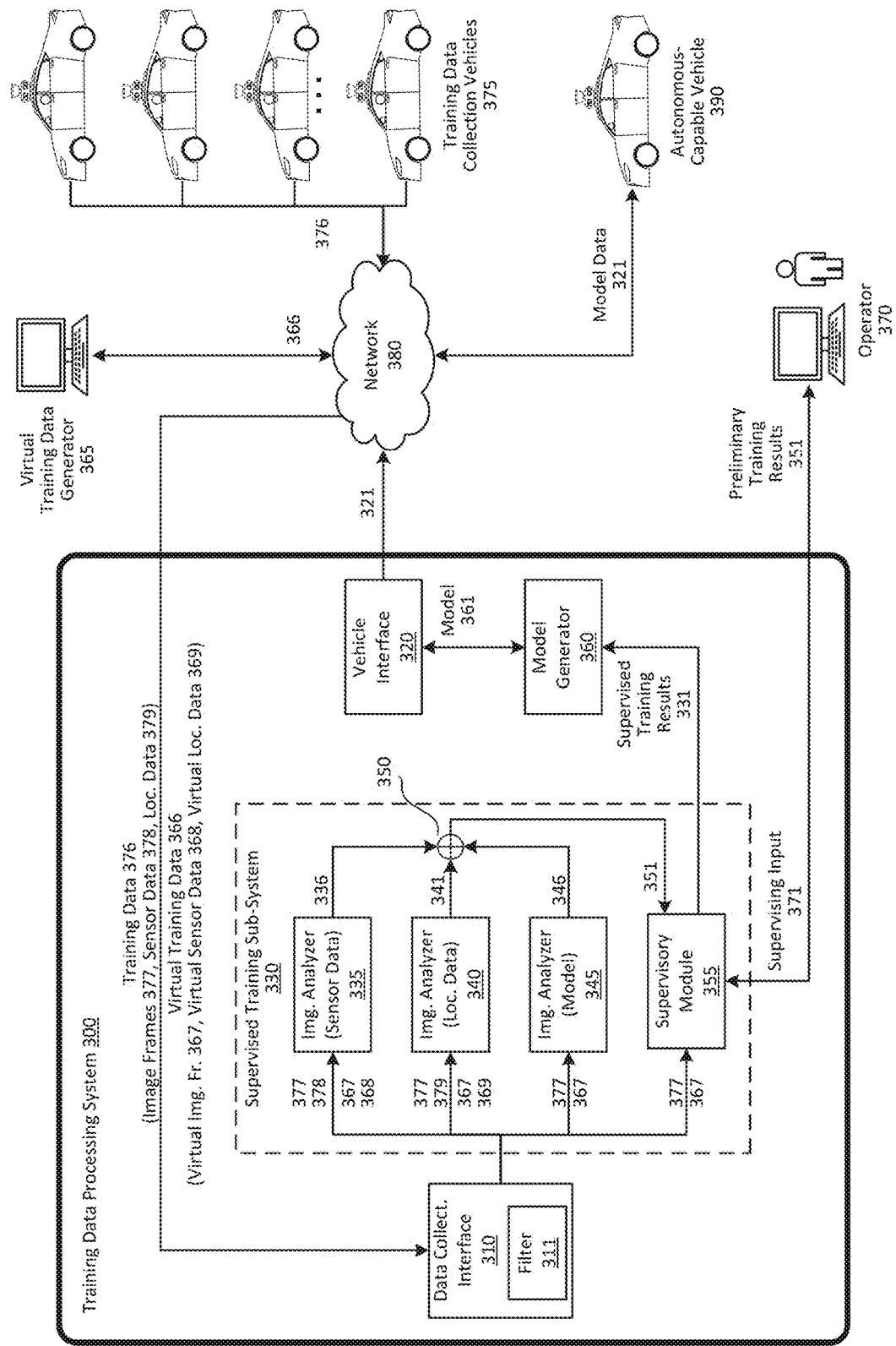
FIG. 3 is a block diagram illustrating an example training data processing system receiving and processing training image frames and other training data, in accordance with examples described herein.

FIG. 3 is a block diagram illustrating an example training data processing system receiving and processing training image frames and other training data, in accordance with examples described herein. In the below discussion of FIG. 3, reference may be made to features and examples described with respect to FIGS. 1-2. For instance, an autonomous-capable vehicle 390 in communication with training data processing system 300 of FIG. 3 may be the autonomous-capable vehicle 10 of FIG. 1 or the autonomous-capable vehicle 200 of FIG. 2.

Referring to FIG. 3, the training data processing system 300 can receive training data 376 to generate or update a machine-learned model for identifying drivable space in image frames for use in collision-avoidance systems in an autonomous-capable vehicle 390. The training data processing system 300 can include a data collection interface 310 to receive training data 376, including training image frames 377, associated sensor data 378, and associated location data 379. The training data 376 can be received from a plurality of training data collection vehicles 375 carrying various sensors and cameras to continuously capture training image frames 377, sensor data 378, and location data 379 as the training data collection vehicles 375 traverse roadways. The training data collection vehicles 375 can include sensors (e.g., cameras, LIDAR, radar, sonar, GPS, etc.) that are similar to those equipped by the autonomous-capable vehicle 390 that receives the machine-learned model generated using the training data 376. Each captured training image frame 377 can be associated with a set of sensor data 378 (e.g., LIDAR measurements, radar measurements, sonar measurements, etc.) and a set of location data 379 (e.g., GPS data). The training data 376 can be received by the training data processing system 300 from the training data collection vehicles 375 over a network 380, such as a cellular data network (e.g., LTE, HSPA). In other implementations, the training data 376 can also be received by the training data processing system 300 via a physical link (e.g., a serial bus connection) with the training data collection vehicles 375. The training data 376 can also be transferred to the training data processing system 300 by an operator or administrator via a data storage medium (e.g., a flash memory card).

In some examples, the training data collection vehicles 375 are operated by human drivers. In other examples, the training data collection vehicles 375 can be autonomous-capable vehicles that can be operated autonomously or semi-autonomously. Still further, autonomous-capable vehicle 390, which receives the machine-learned models generated by the training data processing system 300, can also transmit training data 376 to the training data processing system 300. In effect, as more and more autonomous-capable vehicles 390 are deployed, more training data 376 can be made available to the training data processing system 300 to improve the machine-learned models used in the vehicles' collision-avoidance systems.

According to embodiments, the training data processing system 300 includes a data collection interface 310 to receive and process the training data 376. The data collection interface 310 can include an image filter 311 to pre-process the received training image frames 377. The image filter 311 can perform a number of pre-processing operations, including altering the hue, color, contrast, and exposure of the training image frames 377 such that the resulting training image frames 377 are generally uniform in such characteristics. The image filter 311 can also detect and filter out training image frames 377 that are unsuitable for training the machine-learned model such as over-exposed, corrupted, or unusable image frames.

In the examples described herein, the training data processing system 300 can include a supervised training sub-system 330, which receives training data 376, including filtered training image frames 377, and associated sensor data 378 and location data 379. The supervised training sub-system 330 generates supervised training results 331, using which a model generator 360 of the training data processing system 300 can generate or update machine-learned models for identifying drivable space depicted in image frames for use in collision-avoidance systems of autonomous-capable vehicles 390. The supervised training results 331 can comprise image frames that are labeled for drivable space. For instance, each region (e.g., a pixel, a group of pixels, etc.) of each image frame can have an associated label identifying the corresponding region as depicting drivable space or non-drivable space. To generate supervised training results, the supervised training sub-system 330 can perform a number of methods of analyses, each being efficient at identifying a particular type of feature in the image frames. For instance, the supervised training sub-system 330 can include an image analyzer (sensor data) 335 that labels the regions of training image frames 377 based on sensor data 378 associated with the image frames 377. Image analysis performed by 335 can be particularly effective at identifying non-stationary features (e.g., pedestrians, other vehicles, etc.). The supervised training sub-system 330 can further include an image analyzer (location data) 340 that labels regions of training image frames 377 based on location data 379 associated with the training image frames 377. Image analysis performed by 340 can be particularly effective at identifying stationary features (e.g., sidewalks, buildings, paved road surfaces) stored in a location or mapping database. The supervised training sub-system can further include an image analysis (model) 345 that identifies and labels the training image frame based on an existing machine-learned model. In addition, the supervised training sub-system 330 can further include a supervisory module 355 that receives an operator input to label regions of training image frames 377 or to correct or supplement the labeling performed by analyzers 335 and 340.

In certain implementations, the image analyzer (sensor data) 335 can label training image frames 377 for drivable space and/or non-drivable space based on sensor data 378 associated with the training image frames 377. As part of this process the image analyzer (sensor data) 335 can generate a labeled image 336, which can be an image file with an associated matrix of labels. For a particular training image frame 377 captured by a training data collection vehicle 375, the image analyzer (sensor data) 335 analyzes an associated set of sensor data 378, which can include LIDAR, sonar, radar measurements taken by sensors of the training data collection vehicle 375 at the time the particular training image frame 377 was captured. Using the sensor data 378, the image analyzer (sensor data) 335 can identify objects depicted in the training image frame 377 and label regions of the training image frame 377 corresponding to such objects as non-drivable space. Regions of the training image frame 377 not corresponding to objects detected using the sensor data 378 can be labeled as drivable space. The image analyzer (sensor data) 335 can be used to identify pedestrians, other vehicles, walls, or moving objects on the road depicted in the training image frames 377. In certain examples, the image analyzer (sensor data) 335 can perform image recognition to determine road surface types depicted in the training image frame 377 and perform labeling in accordance to the determination. For instance, the image analyzer (sensor data) 335 can distinguish between sidewalks (non-drivable space) and paved roads (drivable space).

According to embodiments, the image analyzer (location data) 340 can label training image frames 377 for drivable and/or non-drivable space based on location data 379 associated with the training image frames 377. Similar to the image analyzer (sensor data) 335, the image analyzer (location data) 340 can generate a labeled image 341. For a particular training image frame captured by a training data collection vehicle 375, the image analyzer (location data) 340 analyzes an associated set of location data 379 (e.g., GPS data, GLONASS data, etc.) that indicates a precise location of the training data collection vehicle 375 at the time the particular training image frame 377 was captured. In addition, the location data 379 can further include heading information of the vehicle. The heading information can be determined using a compass of the training data collection vehicle 375 or based on location data collected over time to determine a trajectory of the training data collection vehicle 375. The image analyzer (location data) 340 can query a location or mapping database using the precise location and heading of the training image collection vehicle 375 and match nearby features identifiable in the location or mapping database (e.g., paved road surfaces, sidewalks, buildings, other mapped features, etc.) to features depicted in the training image frame 377. A feature in the location or mapping database can be matched to regions of the training image frames 377 based on its location and direction relative to the training data collection vehicle 375. As an example, using the precise location and heading of the training data collection vehicle 375, the image analyzer (location data) 340 can determine, by querying the location or mapping database, that a region of the training image frame 377 depicts a sidewalk or a wall. In response to such a determination, the image analyzer (location data) 345 can label the region of the training image frame 377 as non-drivable space. As another example, using the precise location and heading of the training data collection vehicle 375, the image analyzer (location data) 340 can determine that another region of the training image frame 377 depicts a paved road surface and can, in response, label that region of the training image frame 377 as drivable space. The location or mapping database used by the image analyzer (location data) 340 can be managed by the training data processing system 300 or by a third-party mapping service.

According to embodiments, the results of various methods of image analyses and labeling can be reconciled and combined. As shown in FIG. 3, the labeled images 336, 341, and 346 generated by the image analyzer (sensor data) 335, image analyzer (location data) 340, and image analyzer (model) 345, respectively, are reconciled and combined by label reconciler 350. Since, as described above, each method of image analysis can be effective at identifying a particular type of feature depicted in the training image frames 377, the label reconciler 350 can combine the labeled images 336 and 341 in a manner so as to maximize the efficacy of the combination. In the example depicted in FIG. 3, different methods of image analyses are performed by image analyzer (sensor data) 335 and image analyzer (location data) 340. Analysis performed by image analyzer (location data) 340 can be effective at identifying stationary or mapped features depicted in the training image frame 377 and analysis performed by image analyzer (sensor data) 335 can be effective at identifying moving features depicted in the training image frame 377. Thus, the label reconciler 350 can begin the reconciliation process with the results of image analyzer (location data) 340—labeled image 341—that identifies stationary or mapped features depicted in the training image frame 377. Then, the label reconciler 350 can overlay the results of the image analyzer (sensor data) 335—labeled image 336—to arrive at preliminary training results 351. In this manner, the label reconciler 350 can begin with a depiction of the stationary or mapped features such as paved road surfaces (drivable space) and can subsequently overlay identified moving features such as another vehicle to arrive at the preliminary training results 351. As an example, the label reconciler 350 can begin with labeled image 341, which indicates that a certain region of the training image frame 377 depicts drivable space (e.g., paved road identified by image analyzer (location data) 340 using location data 379). The label reconciler 350 can examine labeled image 336 which indicates that the certain region depicts non-drivable space (e.g., another vehicle identified by image analyzer (sensor data) 335 using sensor data 378). The resulting preliminary training results 351 will indicate that the certain region corresponds to non-drivable space because, even though it corresponds to a paved road, it is occupied by another vehicle.

In certain implementations, the label reconciler 350, in combining the analyses performed by image analyzer (sensor data) 335 and image analyzer (location data) 340, can identify issues corresponding to particular regions of the training image frames 377. For instance, the label reconciler 350 may not be able to reconcile the analyses performed by image analyzer (sensor data) 335—labeled image 335—with the analyses performed by image analyzer (location data) 340—labeled image 341 for a particular portion of the training image frame 377. In response, the label reconciler 350 can identify the particular portion of the training image frame 377 as having reconciliation issues. In turn, the particular portion of the training image frame 377 can be marked for supervising input 371 from an operator 370 to manually label the particular portion of the training image frame 377 as corresponding to drivable space or non-drivable space.

In some examples, the supervised training sub-system 330 can further include a supervisory module 355 to receive supervising input 371 from an operator 370. The operator 370 can provide the supervising input 371 to resolve issues in reconciling the labels to regions of the training image frame 367 assigned by the image analyzer (sensor data) 335 and the image analyzer (location data) 340. The operator 370 can further correct or supplement the programmatic analyses performed by the aforementioned functional blocks of the supervised training sub-system 330. The operator 370 can review the training image frame 367 and the associated analyses (e.g., preliminary training results 351) performed by the image analyzer (sensor data) 335 and the image analyzer (location data) 340. For instance, the operator 370 can view the training image frame 367 and the preliminary training results 351, including the labels assigned to the training image frame 367 indicating regions of drivable space and non-drivable space as determined by the image analyzer (sensor data) 335 and the image analyzer (location data) 340. The operator 370 can verify the labels indicated in the preliminary training results 351 by matching them to the displayed training image frame, both being displayed on an operator user interface (not shown in FIG. 3). If the operator 370 determines that a certain region is mislabeled (e.g., a portion of the image frame 367 corresponding to a vehicle being labeled as drivable space), the operator 370 can provide supervising input 371 to correct the mislabel. Based on the preliminary training results 351 and the supervising input 371, the supervisory module 355 can generate supervised training results 331 that incorporates the supervising input 371 in correcting or supplementing the preliminary training results.

According to embodiments, the training data processing system 300 can include a model generator 360 to generate or update the machine-learned model used to identify drivable space in captured image frames. The model generator 360 can generate or update the machine-learned model 361 based on the supervised training results 331. In certain examples, the model generator 360 can generate or update the machine-learned model 361 as a convolution neural network. The training data processing system 300 can further include a vehicle interface 320 for transmitting model data 321 corresponding to the machine-learned model 361 to the autonomous-capable vehicle 390 over network 380. In other examples, the model data 321 can also be transferred to the autonomous-capable vehicle 390 via a direct data link (e.g., a bus connection) or a removable storage device (e.g., a mass storage media device).

In certain implementations, virtual training image data 366 can also be generated by a virtual training data generator 365 for use in generating or updating the machine-learned model 361. The virtual training data generator 365 can be any computing system capable of generating virtual environments that correspond to simulated road conditions from a perspective similar to that of the cameras mounted on the training data collection vehicles 375. Image frames of such virtual environments can be captured by the virtual training data generator 365 as virtual training image frames 367. Other data regarding the virtual environments can be generated by the virtual training data generator 365 as virtual sensor data 368 and virtual location data 369. Examples can include computing systems for generating virtual reality or video game content. The data collection interface 310 and image filter 311 can process the virtual training images frames 367 to be similar in characteristics (e.g., color, hue, contrast, exposure, etc.) to the training image frames 377 captured by the cameras of the training data collection vehicles 375.

Collision-Avoidance System Methodology

Figure 4:
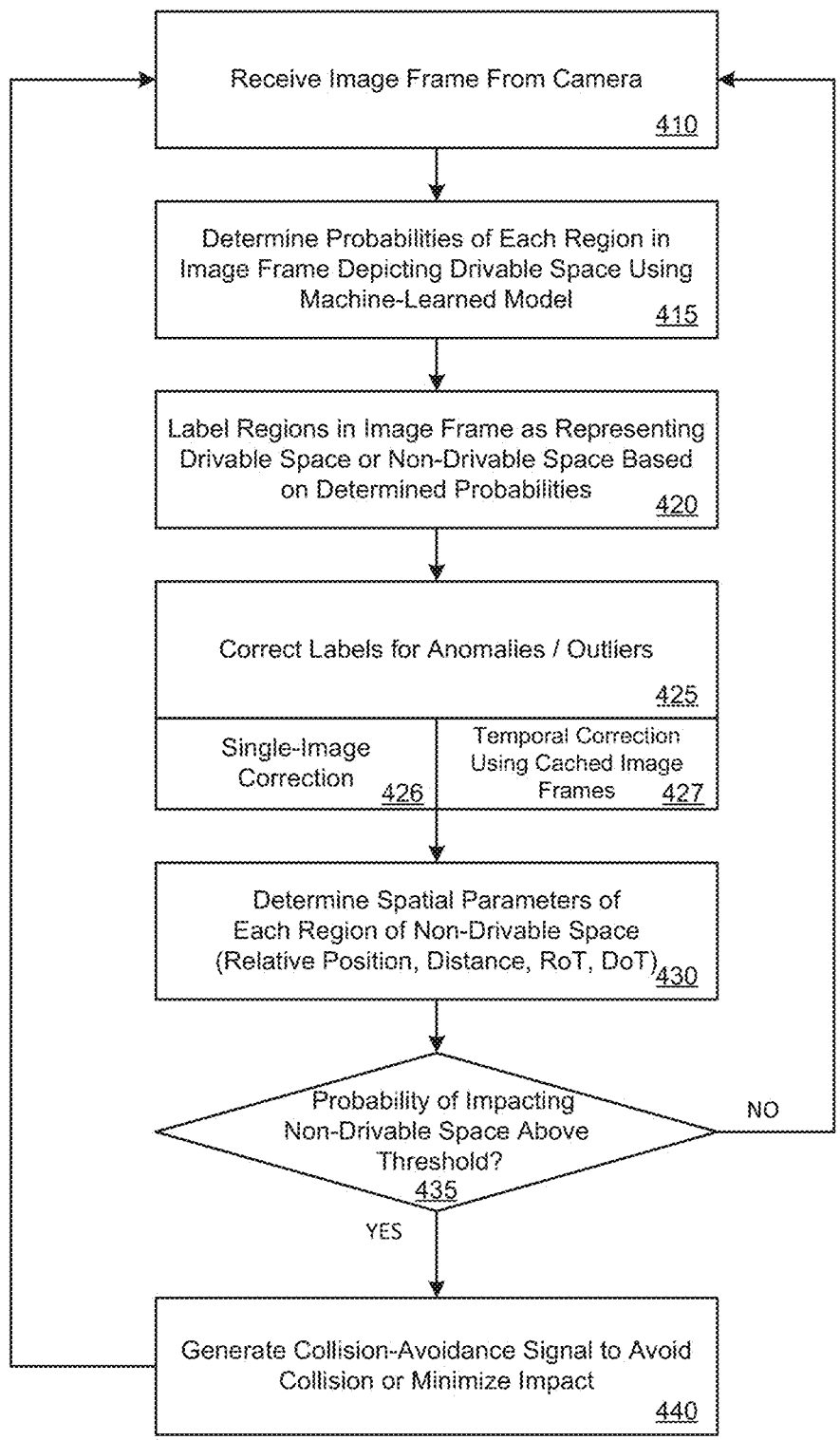
FIG. 4 is a flow chart describing an example method of operating an exemplary collision-avoidance system within an autonomous-capable vehicle, in accordance with examples described herein.

FIG. 4 is a flow chart describing an example method of operating an exemplary collision-avoidance system within an autonomous-capable vehicle, in accordance with examples described herein. In the below discussion of FIG. 4, reference may be made to features and examples shown and described with respect to FIGS. 1-3. For instance, the method illustrated in FIG. 4 may be implemented and performed by the exemplary collision-avoidance system 100 of FIG. 1 or the exemplary collision-avoidance system 250 of FIG. 2.

Referring to FIG. 4, the exemplary collision-avoidance system can receive an image frame from a camera mounted on the vehicle (410). The camera can be oriented in a direction of travel of the vehicle such that the captured images depict the roadway and other objects in front of the vehicle 10. The camera can continuously capture image frames for transmission to the collision-avoidance system 100. For example, the camera can capture image frames at a rate of 30 frames per second for transmission to the collision-avoidance system. In turn, the collision-avoidance system can process the received image frames in sequence at the same rate of 30 frames per second.

In some implementations, the vehicle includes a single camera that captures image frames for use by the collision-avoidance system. In other implementations, the vehicle can include multiple cameras such that the collision-avoidance system 100 receives multiple image frames at the same time. The multiple cameras can be positioned at different locations on the vehicle to improve the field of vision or reduce blind spots of the collision-avoidance system. In addition, the multiple cameras (e.g., a stereoscopic camera pair) can be positioned to allow the collision-avoidance system to sense depth. In implementations having multiple cameras, the collision-avoidance system can perform image processing to combine or merge the images for analyses by the collision-avoidance system. For instance, image frames captured by a stereoscopic camera pair can be merged to create a three-dimensional image (e.g., an image with an associated depth map) for analyses by the collision-avoidance system. As another example, image frames captured by multiple cameras having complementary field of vision can be combined to produce a combined image for analyses by the collision-avoidance system.

For each received image frame, the collision-avoidance system can analyze the image frame to determine a respective probability that each region of the image frames depicts drivable space (415). In some implementations, the collision-avoidance system can determine such probabilities on a pixel-by-pixel basis. Thus, for each individual pixel of each image frame received from the camera(s), the collision-avoidance system can determine a corresponding probability that the individual pixel represents drivable space (e.g., road surface that the vehicle can safely traverse). In other examples, the network system can determine such probabilities for groups of pixels (e.g., a cluster of thirty pixels). The collision-avoidance system can perform step 415 by utilizing one or more machine-learned models for recognizing drivable space in image frames. The machine-learned model can be generated using extensive training data that includes a large number of training images that have been previously analyzed for drivable space depicted therein. In at least one example, the machine-learned model utilized by the collision-avoidance system is a convolution neural network.

Based on the determine probabilities, the collision-avoidance system can label individual regions of the received image frame as representing drivable space or non-drivable space (420). For instance, if a particular region's corresponding probability of representing drivable space exceeds a certain threshold, the collision-avoidance system can label the particular region as representing drivable space. On the other hand, if the particular region's corresponding probability of representing drivable space is below the threshold, the collision-avoidance system can label the particular region as representing non-drivable space.

After the received image frame is labeled for drivable space and non-drivable space, the collision-avoidance system can correct the labels for anomalies or outliers (425). The corrections can be performed on a single-image frame basis (426) wherein the image frame and the associated labels are examined for anomalies or outliers. For example, a small region (e.g., a single pixel, or a group of a few pixels) may be labeled as non-drivable space within a greater region that is otherwise consistently labeled as drivable space. The collision-avoidance system can determine the labeling of the small region as an outlier and alter the corresponding labels to correct apparent mislabeling. In addition, corrections can be performed on a temporal basis by examining other image frames recorded at or around the same time as the received image frame (427). The collision-avoidance system can compare the labels assigned to multiple image frames recorded at or around the same time to identify anomalies or outliers in labeling regions of the image frames' as drivable or non-drivable space. If the labeling between two contemporaneously-recorded image frames are inconsistent, the collision-avoidance system can determine to relabel some of the regions of the image frames.

For each region of non-drivable space labeled in the received image frame, the collision-avoidance system can determine corresponding spatial parameters (430). The spatial parameters can include a relative position to the autonomous-capable vehicle, a distance from the autonomous-capable vehicle, a rate of travel, and a direction of travel. Spatial parameters such as the relative position to and the distance from the autonomous-capable vehicle can be determined based on the position of the non-drivable region within the image frame. The machine-learned model can be further trained, based on training data and input, to identify objects depicted in the received image frame and their distances to the autonomous-capable vehicle. Spatial parameters such as the rate of travel and the direction of travel can be calculated by tracking the movement of the region of non-drivable space across multiple image frames analyzed by the collision-avoidance system.

At step 435, the collision-avoidance system can determine a probability whether the autonomous vehicle will impact a region of non-drivable space. The determination can be based on the spatial parameters associated with the non-drivable space as well as vehicle data such as the vehicle's speed, direction, acceleration etc. If the corresponding probability for each of the non-drivable spaces in the received image frame is below a threshold value, the collision-avoidance system can move on to the next image frame received from the camera (410).

On the other hand, if a probability of impact determined for at least one region of non-drivable space of the received image frame exceeds the threshold, the collision-avoidance system generate a collision-avoidance signal to avoid the collision or minimize the impact of the collision (440). The collision-avoidance signal can override other vehicle control signals, such as those generated by the vehicle control system, which controls the operation of the autonomous-capable vehicle in semi-autonomous or autonomous modes of operation. The collision-avoidance signal can cause the autonomous-capable vehicle to engage its brakes. In some examples, the collision-avoidance system can also determine a steering control to steer the vehicle away from the region of non-drivable space to avoid the impending collision. The collision-avoidance system can further receive data from the vehicle control system of the autonomous-capable vehicle. The data can indicate whether the vehicle control system has recognized an impending collision may occur. The collision-avoidance system can be configured to override the vehicle control signals generated by the vehicle control system only when the data indicates that the vehicle control system has not detected that a collision is about to occur. After overriding the vehicle controls at step 440, the collision-avoidance system can continue to receive image frames from the camera for analysis.

Training Data Processing System Methodology

Figure 5:
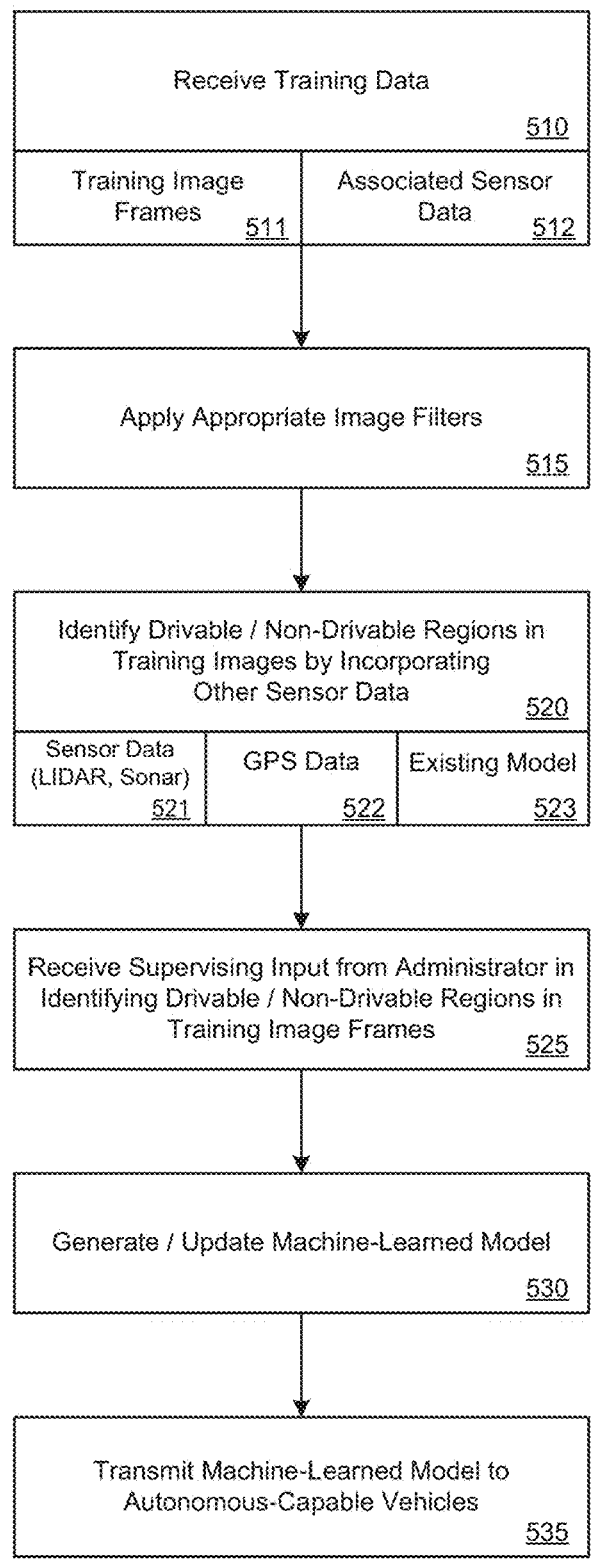
FIG. 5 is a flow chart describing an example method of operating an exemplary training data processing system, in accordance with examples described herein.

FIG. 5 is a flow chart describing an example method of operating an exemplary training data processing system, in accordance with examples described herein. In the below discussion of FIG. 5, reference may be made to features and examples shown and described with respect to FIG. 3. For instance, the method illustrated in FIG. 3 may be implemented and performed by the exemplary training data processing system 300 of FIG. 3.

Referring to FIG. 3, the training data processing system receives training data (510). The training data can be collected by training data collection vehicles (e.g., 375 of FIG. 3) as they traverse roadways. The training data can comprise training image frames 511 and associated sensor data 512. Each training image frame 511 can be associated with a set of corresponding sensor data 512 captured at the time the training image frame 511 is recorded. The sensor data 512 can include LIDAR, sonar, and/or radar data. The training data can further include real-time location data (e.g., GPS data).

According to embodiments, the training data processing system can apply appropriate image filters to the received training image frames (515). The training data processing system can do so to alter characteristics of the received training image frames (e.g., color, hue, contrast, exposure, etc.). In doing so, the training data processing system can ensure that the training image frames using which the machine-learned model is generate are consistent in certain characteristics. This can improve the quality and consistency of the machine-learned model generated using the training image frames.

The training data processing system can analyze the training image frames, associated sensor data, location data, and other data to identify drivable and non-drivable space in the training image frames (520). The analysis can be performed using a variety of techniques. For instance, the training data processing system can identify regions of drivable space in a training image frame using a set of associate sensor data captured at the time the training image frame was recorded (521). Such analysis can be performed using, for example, LIDAR measurements. Based on the LIDAR measurements, the training data processing can determine regions in the training image frame that correspond to a road surface. In response, the training data processing system can identify those regions in the training image frame as drivable space. In addition, LIDAR measurements can further indicate regions in the training image frame corresponding to vehicles or pedestrians. In response, the training data processing system can identify those regions in the training image frame as non-drivable space.

Furthermore, the training data processing system can further analyze real-time location data such as GPS data captured at the time the training image frame was recorded (522). Using the real-time location data, the training data processing system can determine regions of the training image frame that correspond to mapped features such as buildings, sidewalks, road medians, etc. The training data processing system can do so by querying a location or mapping database. Based on a determination that a particular region of the training image frame corresponds to a mapped feature such as a road median, the training data processing system can identify and label the particular region of the training image frame as non-drivable space. In certain examples, the training image frame can also be analyzed by an existing iteration of the machine-learned model to identify drivable-space and/or non-drivable space in the training image frame (523). The results of the analysis by the existing model can be combined and reconciled with results from other analyses to improve the existing iteration of the machine-learned model.

According to embodiments, the training data processing system combines and reconciles the various analyses to programmatically identify regions of the training image frames as drivable or non-drivable space. The combined results can be presented to an administrator terminal for viewing by an administrator. In turn, the training data processing system can receive supervising input from the administrator in identifying drivable or non-drivable space in the training image frames (525). The presentation on the administrator terminal can highlight particular regions of the training image frames where the various programmatic analyses cannot be reconciled or are in conflict with one another and thus require supervising input by the administrator. For instance, the presentation on the administrator terminal can highlight a particular region of the training image frame using a different color or theme as compared with the remainder of the training image frame. The administrator can, via the presentation displayed on the administrator terminal, provide supervising input identifying the particular region as a drivable or non-drivable space. In this manner, the administrator can provide supervising input to reconcile, correct, or supplement programmatic analyses performed by the training data processing system in analyzing training data for generating a machine-learned model to identify drivable space in image frames captured by vehicle cameras. Accordingly, supervising input may be received for only a portion of the received training image frames. In other examples, the administrator can be responsible for labeling the entire training image frame for drivable space. Thus, the administrator can be responsible for "seeding" a collection of labeled training images with sufficient data points to enable the training data processing system to generate an initial machine-learned model that can be subsequently improved with additional training data.

At step 530, the machine-learned model can be generated or updated based on the training data received at step 510. In certain embodiments, the machine-learned model is a convolution neural network. Still further, the machine-learned model can comprise a collection of classifiers. The generated or updated machine-learned model can be transferred or transmitted to autonomous-capable vehicles (535) for use with a collision-avoidance system deployed on the autonomous-capable vehicles. Data corresponding to the machine-learned model can be stored on a storage device on the autonomous-capable vehicle for access by the collision-avoidance system.

Examplary Image Frame

Figure 6:
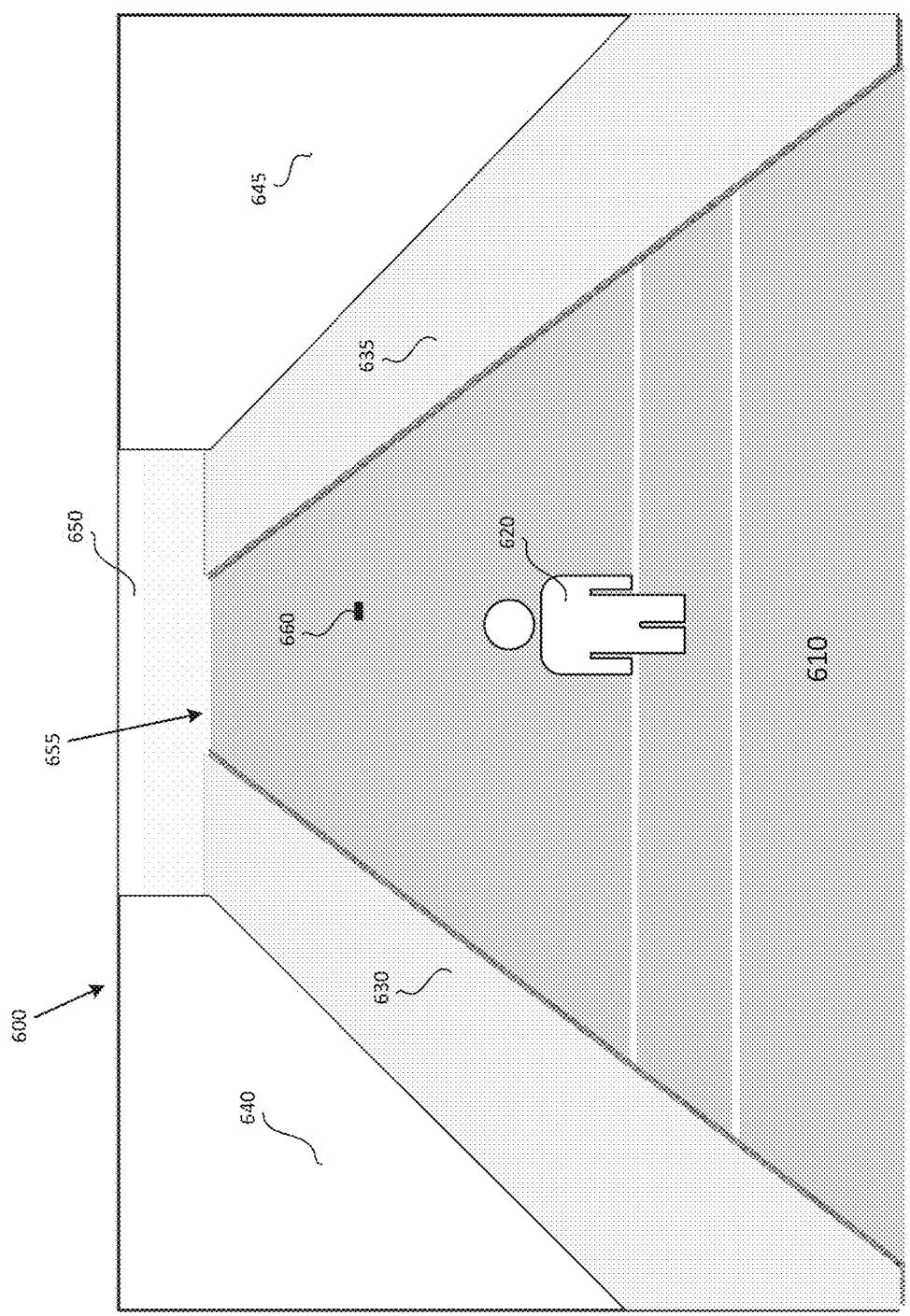
FIG. 6 illustrates an exemplary image frame received and processed by a collision-avoidance system, in accordance with examples described herein.

FIG. 6 illustrates an exemplary image frame received and processed by a collision-avoidance system, in accordance with examples described herein. In the below discussion of FIG. 6, reference may be made to features and examples described with respect to FIG. 1. For instance, the exemplary image frame illustrated in FIG. 6 can be analyzed and processed by the collision-avoidance system 100 of FIG. 1.

Referring to FIG. 6, the illustrated exemplary image frame 600 can be captured by one or more cameras of an autonomous-capable vehicle (e.g., vehicle 10 of FIG. 1). The one or more cameras can be positioned to capture the image frame 600 depicting the environment in front of the autonomous-capable vehicle. The collision-avoidance system can analyze the image frame 600 to label various regions of the image frame 600 as representative of drivable space or non-drivable space using a machine-learned model generated using training data. As can be appreciated, the image frame 600 is merely an illustration and various feature depicted in the image frame 600 are simplified for illustrative purposes.

As illustrated, region 610 depicts a surface of a paved road. The collision-avoidance system can analyze the image frame 600 and label the region 610 as drivable space using the machine-learned model. Region 620 of image frame 600 depicts a pedestrian on walking on the paved road. The collision-avoidance system can analyze the image frame 600 using the machine-learned model and label region 620 as representing non-drivable space. Similarly, for regions 630 and 635, which depict sidewalks, and regions 640 and 645, which depict walls, the collision-avoidance system can label those regions as non-drivable space.

In some examples, the collision-avoidance system can be configured to recognize regions of the image frame 600 as a region of the image frame 600 above a horizon 655. The collision-avoidance system can ignore such a region as being inconsequential in determining whether to generate collision-avoidance signals. Furthermore, region 660 can correspond to an anomaly in the image frame 600. The anomaly can be caused by an error of the image sensor of the camera or can be a lighting effect. In other examples, the anomaly can be a small object on the road that can be safely ignored by the collision-avoidance signal. As described above, the collision-avoidance system may initially label region 660 as a non-drivable space by applying the machine-learned model. However, using error-correction techniques, the anomaly can be detected and re-labeled as drivable space. In this manner, the collision-avoidance system will not needlessly generate collision-avoidance signals to avoid impacting the anomalous region.

In analyzing image frame 600, the collision-avoidance system can determine that based on spatial parameters determined for non-drivable space region 620 corresponding to the pedestrian and vehicle data (e.g., speed, direction of travel, acceleration, etc.), impact with region 620 is about to occur. In response, the collision-avoidance system can generate collision-avoidance signals to engage the brakes of the vehicle to avoid impacting the pedestrian.

Hardware Diagram

Figure 7:
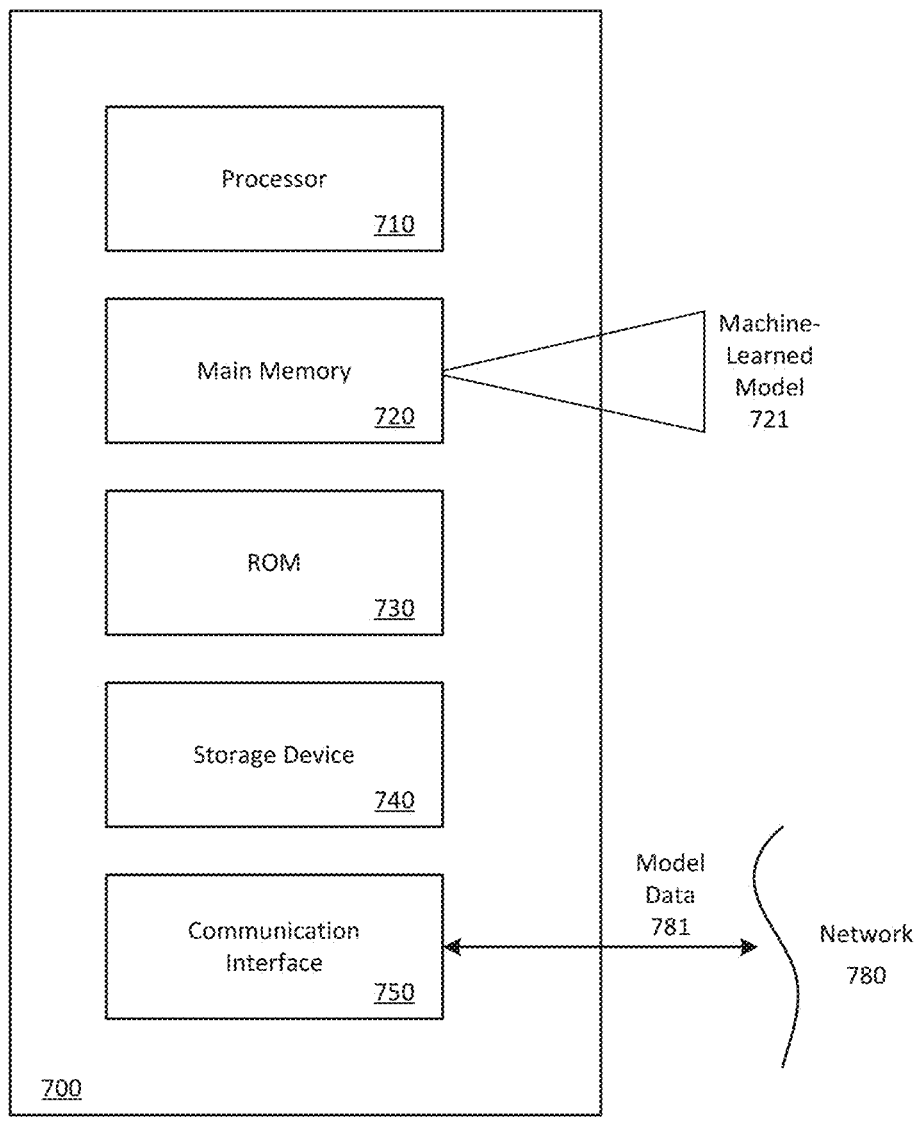
FIG. 7 is a block diagram that illustrates a computer system upon which examples described herein may be implemented.

FIG. 7 is a block diagram that illustrates a computer system upon which examples described herein may be implemented. In the context of FIG. 1, the collision-avoidance system 100 may be implemented using a computer system 700 such as described by FIG. 7. The collision-avoidance system 100 may also be implemented using a combination of multiple computer systems as described in connection with FIG. 7.

In one implementation, the computer system 700 includes processing resources 710, a main memory 720, a read-only memory (ROM) 730, a storage device 740, and a communication interface 750. The computer system 700 includes at least one processor 710 for processing information stored in the main memory 720, such as provided by a random access memory (RAM) or other dynamic storage device, for storing information and instructions which are executable by the processor 710. The main memory 720 also may be used for storing temporary variables or other intermediate information during execution of instructions to be executed by the processor 710. The computer system 700 may also include the ROM 730 or other static storage device for storing static information and instructions for the processor 710. A storage device 740, such as a magnetic disk or optical disk, is provided for storing information and instructions.

The communication interface 750 enables the computer system 700 to communicate with one or more networks 780 (e.g., cellular network) through use of the network link (wireless or wired). Using the network link, the computer system 700 can communicate with one or more computing devices and one or more servers. In accordance with examples, the computer system 700 receives model data 781 corresponding to a machine-learned model for identifying drivable and non-drivable spaces in image frames from over network 780 from one or more servers (e.g., training data processing system 300 of FIG. 3). The model data 781 can be received to update an existing machine-learned model 721 stored in the main memory of the computer system 700. The executable instructions stored in main memory 720 can further include instructions to perform error corrections on labeled image frames, instructions to determine spatial parameters corresponding to regions of image frames labeled as non-drivable space, and instructions to determine whether, based on spatial parameters and vehicle data, impact with the region of non-drivable space is about to occur, and instructions to generate collision-avoidance signals to control the vehicle and avoid the imminent collision. By way of example, the instructions and data stored in the memory 720 can be executed by the processor 710 to implement an example collision-avoidance system 100 of FIG. 1. The processor 710 is configured with software and/or other logic to perform one or more processes, steps and other functions described with implementations, such as described by FIGS. 1-6, and elsewhere in the present application.

Examples described herein are related to the use of the computer system 700 for implementing the techniques described herein. According to one example, those techniques are performed by the computer system 700 in response to the processor 710 executing one or more sequences of one or more instructions contained in the main memory 720. Such instructions may be read into the main memory 720 from another machine-readable medium, such as the storage device 740. Execution of the sequences of instructions contained in the main memory 720 causes the processor 710 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A vehicle comprising:
multiple sensors including a camera for capturing images;
a collision-avoidance system being configured to perform steps including:
receiving a first image from the camera;
performing image analysis on at least a portion of the first image to determine respective probabilities that regions of the first image depict drivable space;
determining a plurality of regions of the first image as depicting non-drivable space based on the respective probabilities;
determining that the vehicle is likely to impact one of the plurality of regions of the first image labeled as depicting non-drivable space; and
in response to determining that the vehicle is likely to impact one of the plurality of regions of the first image determined as depicting non-drivable space, generating a collision-avoidance signal, the collision-avoidance signal being associated with an action that avoids a collision or minimizes the impact of the collision of the vehicle with the region of non-drivable space.

2. The vehicle of claim 1, further comprising a vehicle control system to control the vehicle, the vehicle control system being configured to (i) receive sensor input from the multiple sensors, and (ii) generate, based on the sensor input, vehicle control signals.

3. The vehicle of claim 2, wherein the collision-avoidance system operates independently of the vehicle control system.

4. The vehicle of claim 2, wherein the collision-avoidance signal overrides at least one of the vehicle control signals generated by the vehicle control system.

5. The vehicle of claim 2, wherein the collision-avoidance system and the vehicle control system utilize a shared set of hardware resources including a shared memory resource and at least one shared processor.

6. The vehicle of claim 2, wherein the collision-avoidance system and the vehicle control system utilize separate sets of hardware resources.

7. The vehicle of claim 1, wherein the image analysis is performed using a machine-learned model.

8. The vehicle of claim 7, wherein the machine-learned model is a convolution neural network.

9. The vehicle of claim 7, wherein the machine-learned model is generated using training data, including training images.

10. The vehicle of claim 9, wherein training data further includes sensor data and wherein each training image is associated with a set of corresponding sensor data captured contemporaneously with the training image.

11. The vehicle of claim 10, wherein the sensor data comprises LIDAR measurements.

12. The vehicle of claim 7, wherein the machine-learned model is generated based on a supervising input received from an administrator, the supervising input identifying portions of a training image as representative of drivable space or non-drivable space.

13. The vehicle of claim 1, wherein determining the plurality of regions of the first image as depicting non-drivable space comprises:
identifying the plurality of regions of the first image by comparing each of the respective probabilities with a threshold value; and
labeling each of the plurality of regions of the first image as depicting non-drivable space.

14. The vehicle of claim 1, wherein the collision-avoidance signal causes the vehicle to activate one or more brakes of the vehicle.

15. The vehicle of claim 1, wherein the collision-avoidance system is configured to further perform steps including:
receiving a second image from the camera; and
wherein determining the plurality of regions of the first image as depicting non-drivable space is based further on analyzing at least a portion of the second image.

16. A collision-avoidance system on a vehicle, the collision-avoidance system comprising circuitry configured to:
receive a first image from a camera;
perform image analysis on at least a portion of the first image to determine respective probabilities that regions of the first image depict drivable space;
determine a plurality of regions of the first image as depicting non-drivable space based on the respective probabilities;
determine that the vehicle is likely to impact one of the plurality of regions of the first image labeled as depicting non-drivable space; and
in response to determining that the vehicle is likely to impact one of the plurality of regions of the first image determined as depicting non-drivable space, generate a collision-avoidance signal, the collision-avoidance signal being associated with an action that avoids a collision or minimizes the impact of the collision of the vehicle with the region of non-drivable space.

17. The collision-avoidance system of claim 16, wherein the image analysis is performed using a machine-learned model, and wherein the machine-learned model includes a convolution neural network.

18. The collision-avoidance system of claim 16, wherein the collision-avoidance system operates independently of a vehicle control system to control the vehicle, the vehicle control system being configured to (i) receive sensor input from multiple sensors of the vehicle, and (ii) generate, based on the sensor input, vehicle control signals.

19. A computer-implemented method of operating a collision-avoidance system on a vehicle, comprising:
receiving a first image from a camera;
performing image analysis on at least a portion of the first image to determine respective probabilities that regions of the first image depict drivable space;
determining a plurality of regions of the first image as depicting non-drivable space based on the respective probabilities;
determining that the vehicle is likely to impact one of the plurality of regions of the first image labeled as depicting non-drivable space; and
in response to determining that the vehicle is likely to impact one of the plurality of regions of the first image determined as depicting non-drivable space, generating a collision-avoidance signal, the collision-avoidance signal being associated with an action that avoids a collision or minimizes the impact of the collision of the vehicle with the region of non-drivable space.

20. The computer-implemented method of claim 19, wherein the image analysis is performed using a machine-learned model, and wherein the machine-learned model includes a convolution neural network.

* * * * *